United States Patent Office 3,358,284
Patented Dec. 12, 1967

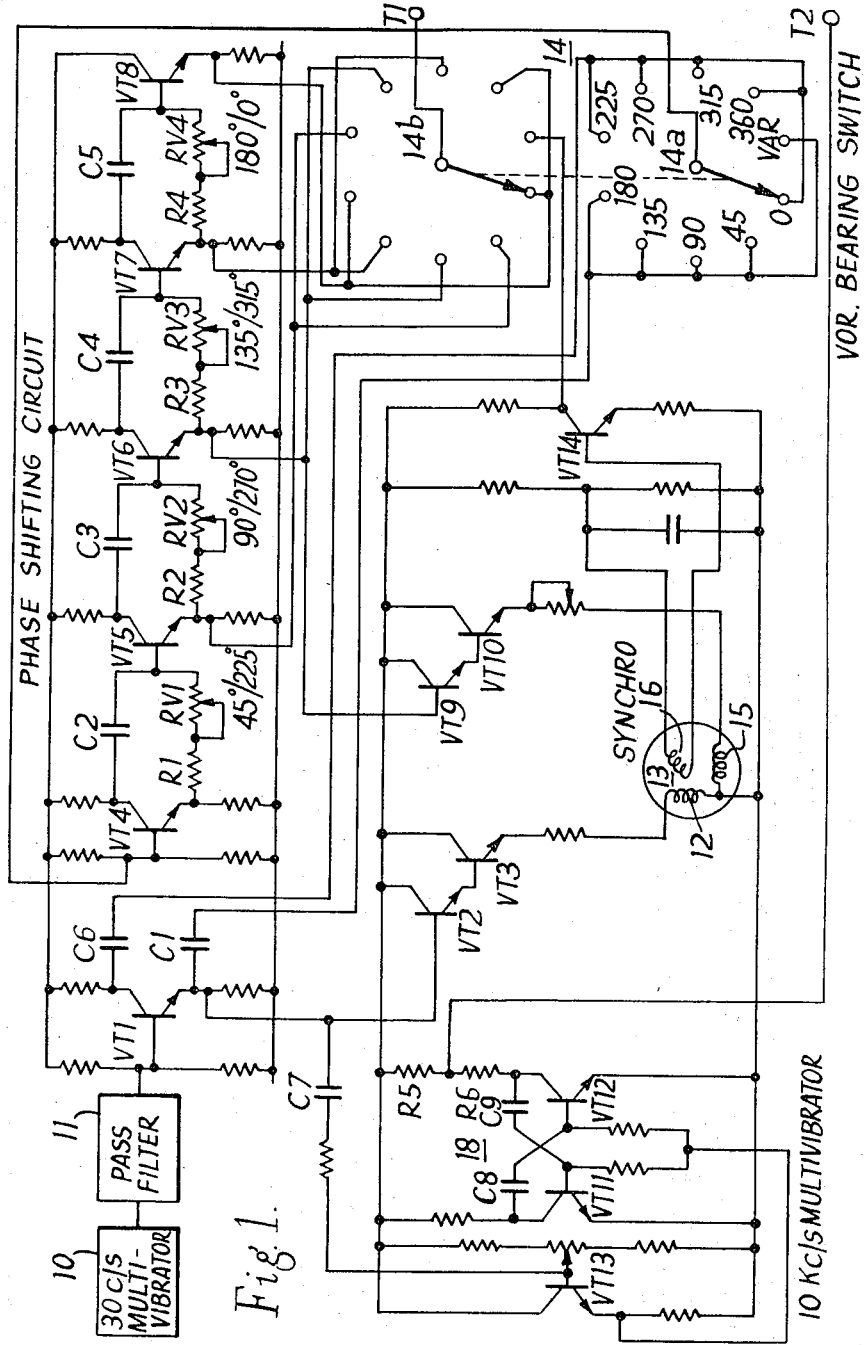

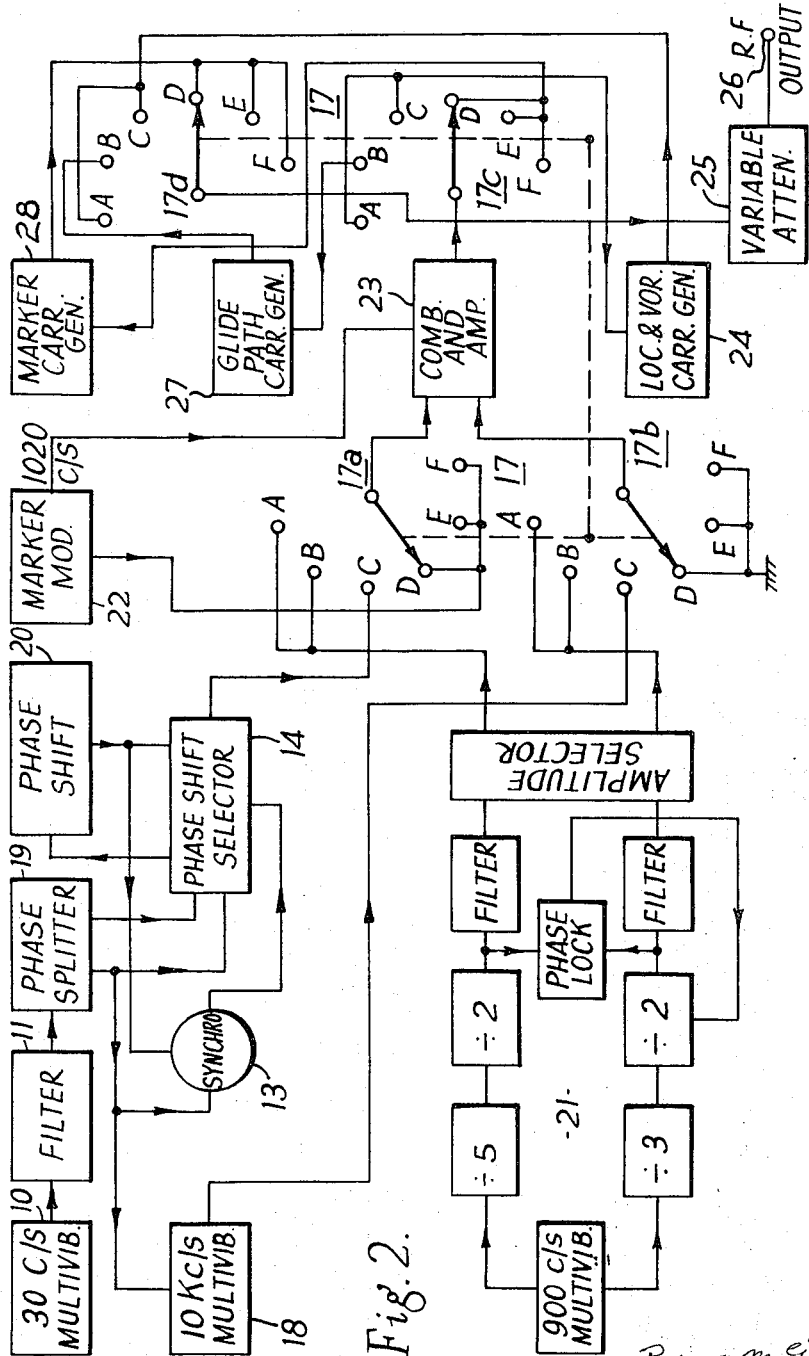

3,358,284
RADIO-FREQUENCY SOURCE FOR
SIMULATING VOR SIGNALS
Robert Mathieson Gemmell Millar and Richard Morris Trim, Harlow, Essex, England, assignors to A. C. Cossor Limited, Harlow, Essex, England
Filed Dec. 16, 1965, Ser. No. 514,304
Claims priority, application Great Britain, Dec. 28, 1964, 52,570/64
13 Claims. (Cl. 343—106)

ABSTRACT OF THE DISCLOSURE

A source for testing the VOR receivers of aircraft is described. The source includes a number of stages each of which provides a predetermined phase-shift, the stages being connected to provide cumulative phase shift.

Signals of varying phase-shift can be selected in steps, using a switch coupled to the stages, and a signal of continuously variable phase can be obtained from a synchro, the stator windings of which are coupled to appropriate phase-shift stages. An audio oscillator supplies the phase-shift stages, and frequency modulates a sub-carrier oscillator, the outputs from the stages and the sub-carrier oscillator being combined and used to modulate a carrier-frequency signal, to provide a variable VOR signal. The test source also includes circuits for simulating ILS signals.

---

The present invention relates to radio frequency sources for testing the aircraft receivers of V.H.F. omnirange-range (VOR) direction-indicating systems. Such radio frequency sources may also include circuits providing signals for testing the instrument landing (ILS) facilities of aircraft receivers. Circuits providing such ILS signals are described in the specification of our co-pending application Ser. No. 514,303, filed Dec. 16, 1965.

The object of the VOR system is to make available to an aircraft its bearing from a radio beacon. The beacon transmits one omnidirectional signal (that is a signal having the same field strength in all directions), and a rotating beam. The omnidirectional signal is, in the present practice, a carrier signal amplitude-modulated by a sub-carrier of 9960 c./s. which itself is frequency-modulated at 30 c./s. A loop aerial is used to transmit the omnidirectional signal.

Surrounding the loop aerial at the corners of a square are four vertical aerial elements which are used to transmit the rotating beam. The elements are fed with a carrier signal and are so connected that the signal radiated from one pair of diagonally opposite elements is in phase quadrature with that radiated from the other pair, and the signals radiated from the elements of each pair are 180° out of phase with each other. The resultant field pattern can be regarded as a figure of eight having a positive and a negative lobe. This field pattern is made to revolve by feeding the signals to the elements through a goniometer rotating at 1800 r.p.m.

When an aircraft receives the signal from the four elements, the signal appears to be amplitude-modulated at 30 c./s., and the relative phase of this modulation, with respect to the omnidirectional signal, indicates the bearing of the aircraft from the beacon.

One object of the present invention is therefore to provide an apparatus for varying the phase of a signal. The apparatus is included in a radio-frequency source which is able to simulate the VOR signals, which would be received by an aircraft at various bearings from a VOR radio beacon, by providing a signal whose phase in relation to that of another signal can be set as desired.

In instrument landing systems (ILS), transmitters are arranged to direct four highly directional radio beams above and below, and to the right and left of the path which an aircraft should take on approach to an airport. The high and low beams are used to correct the glide path of the aircraft, and the left and right beams, known as localised beams, are used to correct its lateral position. Each pair of beams is transmitted at the same radio frequency which is different for the two pairs and the beams of each pair are separately modulated by audio signals at two different frequencies, in present practice 90 c./s. and 150 c./s. It is the relative depth of modulation (D.D.M.) of the carriers received at the aircraft which enables the position of the aircraft to be indicated. Visual indication is given in the aircraft to allow the crew to correct its course.

Another feature of instrument landing (ILS) systems is the provision of marker signals indicating the distance of an aircraft from a certain point.

According to the present invention there is provided a radio-frequency source which includes apparatus arranged to provide, from an input signal an output signal of continuously-variable phase in relation to the input signal, or whose phase varies in steps. The source comprises a phase-shift circuit having a plurality of stages, each of which cumulatively changes phase by a predetermined amount, and a synchro having at least two stator windings which are so connected to points of different phase shift in the phase-shift circuit that an output signal is induced, in a rotor winding of the synchro when a signal is applied to the phase-shift circuit, the phase of the output signal in relation to the input signal depending on the position of the rotor. Switch means coupled to the phase shift stages are also provided to extract output signals with phases differing by the predetermined amount.

The synchro may be a two-phase synchro having two stator windings. In this instance the phase-shift circuit may provide a phase shift of 90°, and the stator windings may be separately connected one to the input and the other to the output of the phase-shift circuit.

The phase-shift circuit may comprise one or more resistance-capacity stages, and one or more transistor amplifiers in the role of phase-splitters.

The signals applied to the synchro may be supplied through compound emitter-follower circuits connected between the phase-shift circuit and the synchro. The continuously-variable phase-shift apparatus may, as has been mentioned, be part of a radio frequency source simulating VOR signals received in aircraft. The source may include an audio oscillator feeding the phase-shift circuit, one stator winding of the synchro, and a sub-carrier oscillator, thereby providing a sub-carrier signal, frequency-modulated by the signal from the audio oscillator. The variable-phase signal and the modulated sub-carrier signal may be passed to a combining circuit whose output is connected to a modulator, in which a high-frequency carrier signal is modulated by the signal from the mixer to provide the simulated VOR signal.

The phase-shift circuit may comprise a phase-splitter stage providing signals 180° out of phase and four stages each having a phase shift of 45°. By routing a signal through one or more of these stages, the signal can be given any phase shift from 0° to 360° in 45° steps.

Circuits for simulating ILS signals may also, as has been mentioned, be included in the source. In this instance there may be three variable oscillators, providing two variable RF carrier signals, one for the VOR signals and the localiser signals, the other for the glide-path signals, and one non-variable frequency oscillator for the marker signals.

The source may include the circuits described in the specification of our copending application Ser. No. 514,-

303 to provide the variable-amplitude 90 and 150 c./s. signals to modulate the localiser and glide-path carrier signals. A single mixer and amplifier may be used to combine the audio and sub-carrier VOR signals, and the 90 and 150 c./s. ILS signals, switches being provided at the input of the mixer to select the signals required at any time and at the mixer output to pass the combined signals on to the appropriate carrier modulator.

Certain embodiments of the invention will now be described by way of example with reference to the accompanying drawings in which, FIG. 1 is a circuit diagram of part of a radio-frequency source according to the invention, and FIG. 2 is a block diagram of a radio frequency source also embodying the invention.

The circuit shown in FIG. 1 provides a 9960 c./s. signal frequency modulated at 30 c./s. and a variable phase 30 c./s. signal.

A 30 c./s. multivibrator 10, whose frequency can be adjusted by adjusting a variable resistance in series with the cross-coupling capacitors (not shown) is connected to a filter 11 which by cutting out the high frequency components converts the square pulses from the multivibrator to a sinusoidal signal.

A transistor VT1 is used as a phase splitter, two signals 180° out of phase being obtained from the transistor emitter and collector. One of these signals is taken through a compound emitter-follower comprising two transistors VT2 and VT3 to one winding 12 of a two-phase synchro 13.

The phase of the 30 c./s. signal provided by the circuit of FIG. 1 can be varied either continuously or in 45° steps. The selection between continuous and stepped phase-change is made by a VOR bearing switch 14 having two wafers 14a and 14b. Each wafer has ten stationary contacts any one of which may be selected by a wiper, the wipers for each of the two wafers being ganged together. The wiper of 14a is connected to the base of a transistor VT4 and the wiper of 14b is connected to an output terminal T¹ at which an output at 30 c./s. and of phase which is variable relative to that of the source 10 can be obtained. When the switch 14 is in the continuously-variable position designated VAR, a 30 c./s. signal is passed from the emitter of VT1, through a capacitor C1 to a transistor VT4. This transistor is the first in a chain of transistors (VT4 to VT8) coupled by resistance-capacity phase-shift circuits comprising capacitors C2 to C5, fixed resistors R1 to R4 and variable resistors RV1 to RV4. A phase shift which increases cumulatively by 45° after each resistance-capacity circuit is available at the emitters of the transistor VT5 to VT8. The phase shift of each resistance-capacity circuit can be set to 45° by adjusting the variable resistor in that circuit. The emitter of the transistor VT6, providing a signal shifted 90° in phase in relation to that supplied to the winding 12, is connected through transistors VT9 and VT10 to a second stator winding 15 of the synchro 13. The position of a winding 16 on the rotor of the synchro can be set by a control known as the "VOR-VARIABLE DEGREES" bearing control. Therefore the phase of the signal induced in the winding 16 by the signals in the stator windings depends on the setting of this control and can be continuously varied. The induced signal is amplified by a transistor VT14, and then passed through the wafer 14b to circuits, which will be described later, for modulating the VOR carrier signal.

To provide the signal whose phase is variable in 45° steps, the capacitor C1 is connected to the switch contacts 45, 90, 135 and 180 of the wafer 14a, so that the signal through C1 passes first to these contacts and then to the base of the transistor VT4. One of the emitters of the transistors VT5 to VT8 is then selectable by the wafer 14b to provide a signal having a phase shift of 45°, 90°, 135° or 180°. When any one of positions 225, 270, 315, 360 or 0 of the wafer 14a is selected, a signal is taken from the collector of the transistor VT1 through a capacity C6 and applied to the base of the transistor VT4. The signal then selectable at the emitters of the transistors VT5 to VT8 is 225°, 270°, 315°, or 360° (0°) out of phase with the signal at the emitter of transistor VT1, since the emitter and collector signals of a transistor (in this instance the transistor VT1) are 180° out of phase with one another. In the same way as the continuously-variable-phase signal, the stepped-phase signal is passed on from a terminal T1 to modulate the VOR carrier signal.

The other component of the VOR signal, that is a sub-carrier signal at 9960 c./s. frequency-modulated by the audio tone of 30 c./s. is produced by a multivibrator 18 whose frequency is controlled by the 30 c./s. signal. Transistors VT11 and VT12 are connected in a conventional free-running multivibrator circuit. A 30 c./s. signal from the emitter of the transistor VT1 is passed through a coupling capacitor C7 to a transistor VT13 connected as an emitter-follower. This transistor controls the charging time of capacitors C8 and C9 of the multivibrator 18, and thus the 9960 c./s. signal is frequency modulated at 30 c./s. The output from the multivibrator is taken between two resistors R5 and R6 connected to the collector of the transistor VT12 and is passed to a terminal T2.

A radio frequency source providing signals simulating both the VOR and ILS signals which would be received in an aircraft at various positions will now be briefly described with reference to FIG. 2. The VOR circuits already described are shown in the block-diagram FIG. 2, with the same designations and references as are used in FIG. 1. The phase splitter circuit including the transistor VT1 is designated 19 and the phase-shift circuits including the transistors VT4 to VT8 are designated 20.

Circuits providing variable amplitude 90 c./s. and 150 c./s. signals simulate the glide-path and localiser signals are shown generally at 21. These circuits are described in detail in the specification of our copending application Ser. No. 514,303.

A marker-modulator circuit 22, also described in the specification of the application mentioned, provides signals at frequencies of 400 c./s., 1300 c./s. and 3000 c./s. to modulate the marker carrier signal. The marker modulator circuit 22 also provides a 1020 c./s. tone for identification purposes, this tone being combined, as will be described later, with the VOR signals and the localiser signals. The function of the 1020 c./s. tone is to allow a particular airport beacon to be identified. The ILS receiver in an aircraft is tuned to the frequency of the beacon and the 1020 c./s. tone is keyed to provide an identification signal which is usually two letters in Morse Code.

A common combining and amplifying circuit 23 is used to combine several different groups of signals under the control of two wafers 17a and 17b of a switch 17.

In position A of this switch the 90 c./s. and 150 c./s. ILS localiser signals are combined, together with the 1020 c./s. signal. In position B the 90 c./s. and 150 c./s. glide path signals without the 1020 c./s. signal are combined. The VOR 30 c./s. and 9960 c./s. signals are combined, together with the 1020 c./s. signal in position C. At positions D, E, and F the three marker signals at 400 c./s., 1300 c./s. and 3000 c./s. respectively are amplified by the circuit 23. The marker modulator 22 includes a switch (not shown) coupled to the switch 17 which enables selection of the required output frequency and ensures that the 1020 c./s. signal is supplied only in positions A and C.

A wafer 17c of the switch 17 routes the output from the circuit 23 to one of three combined carrier generators and modulators.

A localiser and VOR carrier-generator and modulator 24 includes two crystal-controlled oscillators whose outputs are mixed to provide a carrier signal. The frequencies of the two oscillators can be varied by switching different crystals into the oscillator circuits. Frequencies in the VOR band 112–118 mc./s. and in the localiser band 108–

112 mc./s. can be selected. In positions A and C of the switch 17 the output from the circuit 23 modulates the VOR and localiser carrier signal respectively which is then passed through a wafer 17d of the switch 17 to a variable attenuator 25 and an R.F. output terminal 26.

A glide-path carrier generator and modulator 27 includes a crystal-controlled radio-frequency oscillator whose frequency can be varied by crystal selection to provide channels in the band 329 to 335 mc./s. In the position B of the switch 17 the output from the circuit 23 modulates the glide-path carrier signal from 27 and the modulated signal is passed to the terminal 26 via attenuator 25.

A marker carrier generator and modulator 28 includes a fixed crystal-controlled oscillator providing a carrier signal at 75 mc./s. In positions D, E and F of the switch 17 the 400 c./s., 1300 c./s. and 3000 c./s. tones respectively modulate the 75 mc./s. signal and are similarly passed to the output terminal 26.

What is claimed is:

1. A radio-frequency source for simulating VOR signals, comprising, in combination:
   a phase-shift circuit having input terminals and a plurality of phase-shift stages connected to shift the phase of an input signal applied to said input terminals cumulatively, each of said phase-shift stages having a pair of stage-input terminals and a pair of stage-output terminals, and changing the phase of an input signal, between said pairs of stage-input and stage-output terminals, by a predetermined amount which is the same for all said stages;
   selection means for selecting any pair of said stage-output terminals to provide a signal whose phase is variable in steps;
   a synchro having at least two stator windings and a rotor winding;
   means for separately connecting said input terminals to one of said stator windings, one pair of said stage-output terminals to said other stator winding; and
   means for extracting from said rotor winding, a signal whose phase varies, in relation to said input signal, according to the position of said rotor.

2. A source according to claim 1, wherein said synchro has two stator windings only, and the phase shift between said input terminals and said stage-output terminals, which are connected to said other stator winding, is 90°.

3. A source according to claim 1 wherein at least one of said phase-shift stages includes:
   a transistor having a base, emitter and collector, connected as a phase splitter, for providing signals 180° out of phase of said emitter and said collector;
   substantially reactive means connected between said collector and one of said stage-output terminals; and
   substantially resistive means connected between said emitter and said one of said stage-output terminals.

4. A source according to claim 3, further comprising, in combination:
   an audio oscillator for feeding an audio signal to said phase-shift circuit;
   a sub-carrier oscillator, coupled to said audio oscillator, for providing a sub-carrier signal frequency modulated by said audio signal; and
   combining means for coupling to said phase-shift circuit and said sub-carrier oscillator to combine said sub-carrier signal with said audio signal.

5. A radio frequency source according to claim 4 including means for generating radio-frequency carrier signals, modulated by the output signal from said combining means, to provide a radio-frequency VOR signal.

6. A radio frequency source according to claim 5 including circuits for simulating I.L.S. signals.

7. A source according to claim 1 wherein said phase-shift circuit has four 45° phase-shift stages and in addition a phase-splitter stage with a transistor having a base, emitter and collector for providing signals 180° out of phase at said emitter and said collector, and wherein said selection means includes switch means for connecting said phase-splitter to at least one of said phase-shift stages to provide a phase shift greater than 180°.

8. A source according to claim 7 further comprising, in combination:
   an audio oscillator for feeding an audio signal to said phase-shift circuit;
   a sub-carrier oscillator coupled to said audio oscillator for providing a sub-carrier signal frequency modulated by said audio signal; and
   combining means for coupling to said phase-shift circuit and said sub-carrier oscillator to combine said sub-carrier signal with said audio signal.

9. A radio frequency source according to claim 8, including means for generating radio-frequency carrier signals, modulated by the output signal from said combining means, to provide a radio-frequency VOR signal.

10. A radio frequency source according to claim 8, including circuits for simulating I.L.S. signals.

11. A source according to claim 1, further comprising in combination:
    an audio oscillator for feeding an audio signal to said phase-shift circuit;
    a sub-carrier oscillator, coupled to said audio oscillator, for providing a sub-carrier signal frequency modulated by said audio signal; and
    combining means for coupling to said phase-shift circuit said sub-carrier oscillator, to combine said sub-carrier signal with said audio signal.

12. A radio frequency source according to claim 11 including means for generating radio-frequency carrier signals, modulated by the output signal from said combining means, to provide a radio-frequency VOR signal.

13. A radio frequency source according to claim 12 including circuits for simulating I.L.S. signals.

References Cited

UNITED STATES PATENTS

| | | | |
|---|---|---|---|
| 2,791,744 | 5/1957 | Carney | 329—109 |
| 2,829,346 | 4/1958 | Hughes et al. | 333—29 |
| 2,912,688 | 11/1959 | De Faymoreau et al. | 343—106 |
| 2,924,891 | 2/1960 | Swift | 35—10.2 |
| 3,265,904 | 8/1966 | Spencer | 307—88.5 |

FOREIGN PATENTS 650,137   2/1951   Great Britain.

RODNEY D. BENNETT, *Primary Examiner.*

H. C. WAMSLEY, *Assistant Examiner.*